(12) United States Patent
Sayyah et al.

(10) Patent No.: US 11,085,998 B2
(45) Date of Patent: Aug. 10, 2021

(54) PHOTONIC EDGE COUPLER

(71) Applicant: GM GLOBAL TECHNOLOGY OPERATIONS LLC, Detroit, MI (US)

(72) Inventors: Keyvan Sayyah, Santa Monica, CA (US); Raymond Sarkissian, Studio City, CA (US); Biqin Huang, Rancho Palos Verdes, CA (US); Pamela R. Patterson, Los Angeles, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 16/814,601

(22) Filed: Mar. 10, 2020

(65) Prior Publication Data
US 2021/0124118 A1 Apr. 29, 2021

Related U.S. Application Data

(60) Provisional application No. 62/927,254, filed on Oct. 29, 2019.

(51) Int. Cl.
*G01S 17/88* (2006.01)
*G02B 6/12* (2006.01)
(Continued)

(52) U.S. Cl.
CPC .......... *G01S 7/4818* (2013.01); *G01S 7/4813* (2013.01); *G01S 7/4814* (2013.01); *G01S 7/4815* (2013.01); *G01S 7/4816* (2013.01); *G01S 7/4817* (2013.01); *G01S 7/4911* (2013.01); *G01S 7/4916* (2013.01); *G01S 17/10* (2013.01); *G01S 17/88* (2013.01);
(Continued)

(58) Field of Classification Search
CPC .................................................. G02B 6/1228
See application file for complete search history.

(56) References Cited

U.S. PATENT DOCUMENTS 8,121,450 B2 2/2012 Webster et al.
9,435,949 B2 * 9/2016 Shimizu ............... G02B 6/1228
(Continued)

OTHER PUBLICATIONS

Jacques, Samani, El-Fiky, Patel, Xing, Plant; Optimization of thermo-optic phase-shifter design and mitigation of thermal crosstalk on the SOI platform; Optics Express 10456; vol. 27, No. 8; Apr. 15, 2019.
(Continued)

*Primary Examiner* — Omar R Rojas
(74) *Attorney, Agent, or Firm* — Quinn IP Law

(57) ABSTRACT

A photonic edge coupler includes a slab waveguide and a ridge waveguide. The ridge waveguide includes a silicon wire waveguide, which includes a tapered portion. A first end of the slab waveguide is joined to the ridge waveguide at a junction, and a second end of the slab waveguide forms a first facet. The ridge waveguide defines a longitudinal axis that is associated with a direction of a light signal therein. The first facet is angled at less than 90 degrees relative to the longitudinal axis associated with the direction of the light signal therein. The first facet is disposed opposite to a laser facet associated with a laser waveguide. The longitudinal axis of the ridge waveguide defines a first center point, and the laser facet and the associated laser waveguide define a second center point. The second center point is laterally offset from the first center point.

20 Claims, 4 Drawing Sheets

(51) Int. Cl.
  *G02B 6/122*   (2006.01)
  *G01S 7/481*   (2006.01)
  *G01S 7/4911*  (2020.01)
  *G01S 7/4912*  (2020.01)
  *G01S 17/10*   (2020.01)
  *B60R 11/00*   (2006.01)

(52) U.S. Cl.
  CPC ....... *G02B 6/12004* (2013.01); *G02B 6/1228* (2013.01); *B60R 11/00* (2013.01); *G02B 2006/1215* (2013.01); *G02B 2006/12061* (2013.01); *G02B 2006/12097* (2013.01); *G02B 2006/12121* (2013.01); *G02B 2006/12147* (2013.01)

(56) References Cited

U.S. PATENT DOCUMENTS

| | | | |
|---|---|---|---|
| 10,873,173 B1* | 12/2020 | Guan | G02B 6/126 |
| 2013/0209033 A1 | 8/2013 | Luff et al. | |
| 2018/0120433 A1 | 5/2018 | Eichenholz et al. | |
| 2019/0018110 A1 | 1/2019 | Kremer et al. | |
| 2019/0018114 A1 | 1/2019 | Patterson et al. | |
| 2019/0018120 A1 | 1/2019 | Efimov et al. | |
| 2019/0018139 A1 | 1/2019 | Sayyah et al. | |
| 2019/0018198 A1 | 1/2019 | Sayyah et al. | |
| 2019/0235053 A1 | 8/2019 | Spector | |
| 2019/0302268 A1 | 10/2019 | Singer et al. | |
| 2019/0302269 A1 | 10/2019 | Singer et al. | |
| 2019/0391406 A1 | 12/2019 | Chen | |
| 2020/0011994 A1 | 1/2020 | Thorpe et al. | |
| 2020/0049801 A1 | 2/2020 | Sayyah et al. | |

OTHER PUBLICATIONS

Sacher, Mikkelsen, Huang, Mak, Yong, Luo, Li, Dumais, Jiang, Goodwill, Bernier, Lo, Poon; Monolithically Integrated Multilayer Silicon Nitride-on-Silicon Waveguide Platforms for 3-D Photonic Circuits and Devices; IEEE vol. 106, No. 12; Dec. 2018.

Komljenovic, Bowers; Monolithically Integrated High-Q Rings for Narrow Linewidth Widely Tunable Lasers; IEEE vol. 51, No. 11; Nov. 2015.

* cited by examiner

PHOTONIC EDGE COUPLER

CROSS-REFERENCE TO RELATED APPLICATIONS

This application claims the benefit of U.S. Provisional Patent Application No. 62/927,254 filed on Oct. 29, 2019, the disclosure of which is hereby incorporated by reference.

INTRODUCTION

Light-detection and ranging (LiDAR) is an optical remote sensing technology that operates to acquire positional information of objects in a surrounding environment employing a light emitter and a light sensor. Operation of a LiDAR device includes illuminating objects in the surrounding environment using light emitted from a light emitter, detecting light scattered by the objects using a light sensor such as a photodiode, and determining range of the objects based on the scattered light. A LiDAR device may employ light in the form of a pulse-modulated, frequency-modulated, or phase-modulated laser to measure ranges and other parameters of selected objects. A chip-based LiDAR system includes a photonic chip that uses a laser to generate light. Light from the laser enters into the photonic chip in order to pass through various systems of the photonic chip.

An edge coupler may be employed to receive the light from the laser. However, light can be back-reflected at the edge coupler, which can degrade the linewidth and single frequency operation of the laser. In addition, such back-reflection reduces the intensity of light that is otherwise usable for LiDAR purposes. Accordingly, it is desirable to provide an edge coupler for the photonic chip that reduces an amount of back-reflection that can be coupled into the laser cavity.

SUMMARY

A photonic edge coupler is described, including a photonic edge coupler that is disposed on a silicon photonic chip and arranged to receive light from a high power, low linewidth laser. The photonic edge coupler couples the light into the silicon photonic chip in a manner that considers a near-field profile of the laser and a high degree of vertical divergence that the laser may possess.

The photonic edge coupler includes a slab waveguide and a ridge waveguide disposed on a substrate, wherein the ridge waveguide includes a silicon wire waveguide, which includes a tapered portion. A first end of the slab waveguide is joined to the ridge waveguide at a junction, and a second end of the slab waveguide forms a first facet. The ridge waveguide defines a longitudinal axis that is associated with a direction of a light signal therein. The first facet is angled at less than 90 degrees relative to the longitudinal axis associated with the direction of the light signal therein. The first facet is disposed opposite to a laser facet associated with a laser waveguide. The longitudinal axis of the ridge waveguide defines a first center point at the junction between the first end of the slab waveguide and the ridge waveguide, and the laser facet and the associated laser waveguide define a second center point. The second center point is laterally offset from the first center point.

An aspect of the disclosure includes the tapered portion of the silicon wire waveguide including a tip end, wherein the tip end is recessed from the first center point formed at the junction between the first end of the slab waveguide and the ridge waveguide.

Another aspect of the disclosure includes the slab waveguide forming a lateral-free propagation region.

Another aspect of the disclosure includes the lateral-free propagation region of the slab waveguide being a region that permits free propagation of light in a lateral direction that is parallel to the substrate.

Another aspect of the disclosure includes the ridge waveguide being recessed from the first facet by at least 9 micrometers at the first center point.

Another aspect of the disclosure includes the ridge waveguide including the silicon wire waveguide forming a guided propagation region.

Another aspect of the disclosure includes the tapered portion of the silicon wire waveguide being selected to achieve an optimum efficiency.

Another aspect of the disclosure includes the first facet being an optically smooth coupling facet.

Another aspect of the disclosure includes the slab waveguide being fabricated from silicon oxynitride (SiON).

Another aspect of the disclosure includes the ridge waveguide being fabricated from silicon oxynitride (SiON).

Another aspect of the disclosure includes the ridge waveguide including an upper cladding fabricated from SiON and a bottom cladding fabricated from SiO2.

Another aspect of the disclosure includes the slab waveguide being arranged to effect capture of light signals from the laser that impinges upon the first facet.

The above summary is not intended to represent every possible embodiment or every aspect of the present disclosure. Rather, the foregoing summary is intended to exemplify some of the novel aspects and features disclosed herein. The above features and advantages, and other features and advantages of the present disclosure, will be readily apparent from the following detailed description of representative embodiments and modes for carrying out the present disclosure when taken in connection with the accompanying drawings and the appended claims.

BRIEF DESCRIPTION OF THE DRAWINGS

One or more embodiments will now be described, by way of example, with reference to the accompanying drawings, in which:

FIG. 3-1 schematically illustrates a top-view of a portion of a ridge waveguide including a silicon wire waveguide for an embodiment of a photonic edge coupler, in accordance with the disclosure.

FIG. 3-2 schematically illustrates a cutaway end-view of a portion of a ridge waveguide including a silicon wire waveguide for an embodiment of a photonic edge coupler, in accordance with the disclosure.

The appended drawings are not necessarily to scale and may present a somewhat simplified representation of various preferred features of the present disclosure as disclosed herein, including, for example, specific dimensions, orientations, locations, and shapes. Details associated with such features will be determined in part by the particular intended application and use environment.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some of these details. Moreover, for the purpose of clarity, certain technical material that is understood in the related art has not been described in detail in order to avoid unnecessarily obscuring the disclosure.

The drawings are in simplified form and are not to precise scale. For purposes of convenience and clarity, directional terms such as longitudinal, lateral, top, bottom, left, right, up, over, above, below, beneath, rear, and front, may be used with respect to the drawings. These and similar directional terms are not to be construed to limit the scope of the disclosure. Furthermore, the disclosure, as illustrated and described herein, may be practiced in the absence of an element that is not specifically disclosed herein. As used herein, the term "system" may refer to one of or a combination of optical, mechanical and electrical hardware, sensors, controllers, application-specific integrated circuits (ASIC), combinatorial logic circuits, software, firmware, and/or other components that are arranged to provide the described functionality.

Figure 1:
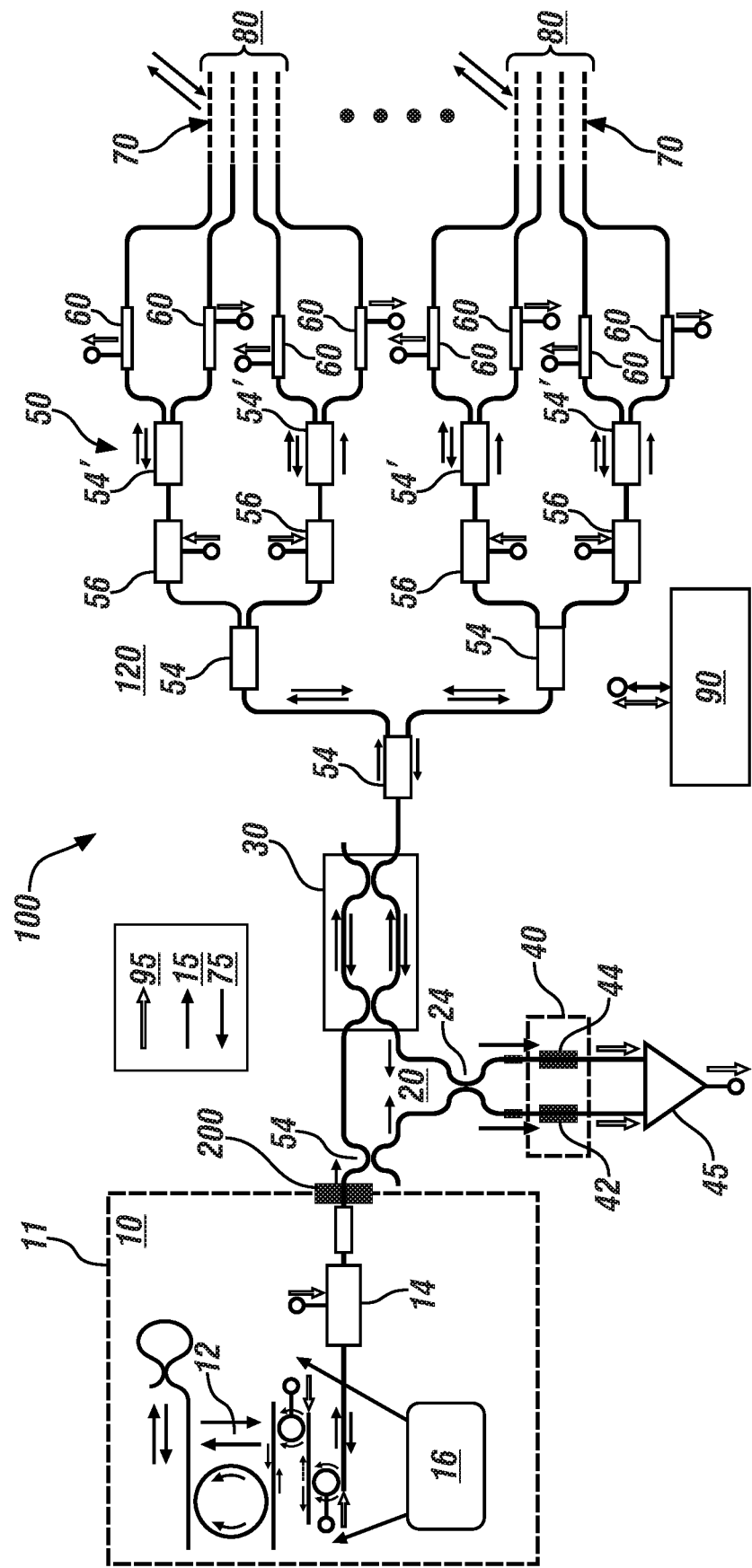
FIG. 1, schematically illustrates an embodiment of a light detection and ranging (LiDAR) device, in accordance with the disclosure.

Referring to the drawings, wherein like reference numerals correspond to like or similar components throughout the several Figures, FIG. 1, consistent with embodiments disclosed herein, schematically illustrates an embodiment of a light detection and ranging (LiDAR) device 100. The LiDAR device 100 described herein is configured as a chip-scale optical phased array based frequency-modulated continuous wave (FMCW) LiDAR device with features that include a single transmit and receive optical phase array (OPA) aperture enabled by the integration of a chip-scale optical circulator. This configuration reduces the chip footprint as compared to other systems. The LiDAR device 100 includes an array of fully-integrated semiconductor optical amplifiers (SOA) that are distributed among the array elements resulting in a power-scalable LiDAR transmitter and receiver. The LiDAR device 100 also includes a widely tunable (~100 nm), fully-integrated, narrow linewidth master laser, which enables wide angle scanning in the off-chip direction parallel to the OPA antennas. In an embodiment of this architecture, a mixed Si and SiN integrated photonic platform is used enabling the co-integration of the narrow linewidth laser source together with active Si photonic components such as Ge-on-Si photodiodes. Such a configuration may enable a mm-size OPA with mm-long optical antennas that enable transmit beams with very low divergence (<0.1°) with no free-space optics. Such a configuration may also enable implementation of a pseudo-random OPA, which results in LiDAR transmit beams with no grating lobes, hence reducing the complexity of FMCW beat signal detection and interpretation, and a compact (<1 cm²) LiDAR sensor that may be enabled by the full integration of the laser, optical circulator and scanning mechanism in a single chip transmit/receive LiDAR aperture implementation.

Referring again to FIG. 1, one embodiment of the LiDAR device 100 is schematically illustrated, including a laser 10, a transmit optical splitter 20, an optical circulator 30, a set of photodetectors 40, including photodetectors 42 and 44 in one embodiment, and an optical phased array 50. The laser 10, the transmit optical splitter 20, the optical circulator 30, the set of photodetectors 40, and the optical phased array 50 are arranged as a chip-scale package on a single semiconductor substrate. The laser 10 generates a transmitted light beam 15 that is transmitted to an aperture 80 of the optical phased array 50 via the transmit optical splitter 20, the optical circulator 30, and the optical phased array 50. The laser 10, the transmit optical splitter 20, the optical circulator 30, the optical phased array 50, and the aperture 80 are interconnected via optical waveguides. A controller 90 is arranged to monitor and control various elements of the LiDAR device 100, with electrical signals employed for communication with the controller 90. Electrical signal communication between the controller 90 and the LiDAR device 100 is indicated by arrows 95.

The transmitted light beam 15 is transmitted to the set of photodetectors 40 via transmit optical splitter 20 via optical waveguides. The aperture 80 of the optical phased array 50 captures a second, received light beam 75 that is transmitted to the set of photodetectors 40 via the optical phased array 50 and the optical circulator 30. The aperture 80 interconnects via the optical phased array 50 to the set of photodetectors 40 via optical waveguides.

The LiDAR device 100 is arranged as a chip-scale package. A chip-scale package (CSP) is an optical and electronic integrated circuit package that includes surface-mount technology, and whose surface area is not more than 1.2 times an original die area. There are many benefits associated with chip-scale packages. Size reduction of the package compared to traditional packages is enabled due to flip-chip mounting of the OPA electronic driver application specific integrated circuit (ASIC) chip to the OPA electrical contact ports, indicated by numeral 11. Another advantage associated with this chip-scale package approach is self-alignment characteristics and the lack of bent leads, features which further help in lowering the manufacturing time and steps.

The laser 10 is a widely tunable (~100 nm), fully-integrated, narrow linewidth master laser 10, and in one embodiment is configured as a scanning frequency modulated continuous wave (FMCW) LiDAR optical transmitter. The laser 10 includes a tunable high-Q laser resonator 12, a tunable laser controller 16, and a semiconductor optical gain chip 14, which feeds via a 1×2 splitter 54 into the optical circulator 30 and the set of photodetectors 40 via the 2×2 coupler 24. The tunable high-Q laser resonator 12 includes, in one embodiment, a micro-ring or a waveguide grating-based high quality factor (Q) integrated optical resonator.

The laser 10 communicatively couples via a photonic edge coupler 200 to the 1×2 splitter 54 into the optical circulator 30 and the photodetector 40.

The set of photodetectors 40 includes photodetectors 42 and 44, which are arranged in a dual balanced photodetector configuration set and connected to a trans-impedance amplifier 45.

The trans-impedance amplifier 45 is in communication with the photodetectors 42 and 44, and generates an output signal that is communicated to the controller 90.

The transmit optical splitter 20 directs the transmitted light beam 15 generated by the laser 10 to the optical phased array 50 via the optical circulator 30, and directs the local oscillator light beam 15 generated by the laser 10 to the set of photodetectors 40.

The optical circulator 30 is configured as a chip-scale component that separates optical signals that travel in opposite directions in the optical waveguides connected to it. The optical circulator 30 is a three- or four-port optical device designed such that light entering any port exits from the adjacent port. Optical circulators are used to separate optical signals that travel in opposite directions in an optical medium (such as optical fiber or waveguide), for example to achieve bi-directional transmission over a single fiber or waveguide. The optical circulator 30 may include an integrated optical circulator 30 that includes an unbalanced Mach-Zehnder or micro-ring resonator based optical circulator 30 that is integrated with a magneto-optical material. The operation wavelength of the integrated optical circulator 30 is tunable using an electro-optic or a thermo-optic effect induced in its optical waveguide(s).

The optical phased array 50 captures the second, received light beam 75 that is transmitted to the optical circulator 30, and the optical circulator 30 directs the received light beam 75 to the set of photodetectors 40. In one embodiment, the optical phased array 50 may be configured as an integrated two-dimensional scanning optical phased array (OPA) with a fully integrated photonic integrated circuit (PIC). Phased-array optics is the technology of controlling the phase and amplitude of light waves transmitting, reflecting, or received by a two-dimensional surface using adjustable surface elements. An optical phased array (OPA) is the optical analog of a radio wave phased array. By dynamically controlling the optical properties of a surface on a microscopic scale, the light beams are steered into an OPA transmitter, or the view direction of sensors in an OPA receiver, without moving parts. Phased array beam steering is used for optical switching and multiplexing in optoelectronic devices, and for aiming laser beams. The PIC facilitates integrating, for example, lasers, modulators, detectors, and filters on a single semiconductor, typically silicon or indium phosphide.

The optical phased array 50 includes a plurality of 1×2 optical splitters 54 a plurality of semiconductor optical amplifiers 56, a plurality of phase shifters 60, a plurality of optical antennas 70, and the aperture 80, all of which are interconnected by optical waveguides. The aperture 80 is arranged as a single transmit and receive aperture. Scanning in the direction perpendicular to the antennas of the OPA are enabled by the phase control of the phase shifters 60, and in the direction parallel to the antennas are enables via wavelength control of the tunable laser 10.

The optical phase array 50 is configured as follows in this embodiment. A first of the 1×2 optical splitters 54 interconnects with the optical circulator 30, and is connected in series with a pair of the 1×2 optical splitters 54 and arranged in a cascaded configuration of N branches. The outputs of the pairs of a number of the 1×2 optical splitters 54 are each connected to one of the semiconductor optical amplifiers 56, which are connected to a second set of the 1×2 optical splitters 54', each which feeds into one of a plurality of phase shifters 60, which lead into respective optical antennas 70. The semiconductor optical amplifiers 56 and the phase shifters 60 communicate with and are controlled by the controller 90. It should be noted that is some embodiments, the semiconductor optical amplifiers 56 are also placed in the higher order splits of the optical phased array in order to produce a higher transmit optical power level.

The plurality of optical antennas 70 are mm-long optical antennas that include grating couplers with uniform near-field emission patterns. Each of the plurality of optical antennas 70 operates as a transmit antenna and as a receive antenna.

The semiconductor optical amplifiers (SOAs) 56 of the optical phased array 50 are arranged to generate a power-scalable optical phased array. The SOAs 56 of the optical phased array 50 are controllable to vary signal intensity of the transmitted light beam 15 that is generated by the laser 10. The SOAs 56 of the optical phased array 50 are controllable to vary signal intensity of the received light beam 75 as well.

The plurality of optical antennas 70 of the optical phased array 50 are fed coherent signals having intensities that vary based upon the SOAs 56.

The laser 10, the transmit optical splitter 20, the optical circulator 30, the set of photodetectors 40, and the optical phased array 50 are arranged on a single semiconductor substrate 120. This includes the laser 10, the transmit optical splitter 20, the optical circulator 30, the set of photodetectors 40, and the optical phased array 50 being arranged on a silicon integrated photonic platform that is fabricated from mixed silicon and silicon nitride in one embodiment. A feedback circuit provides for the tunable laser wavelength control and stabilization.

Figure 2:
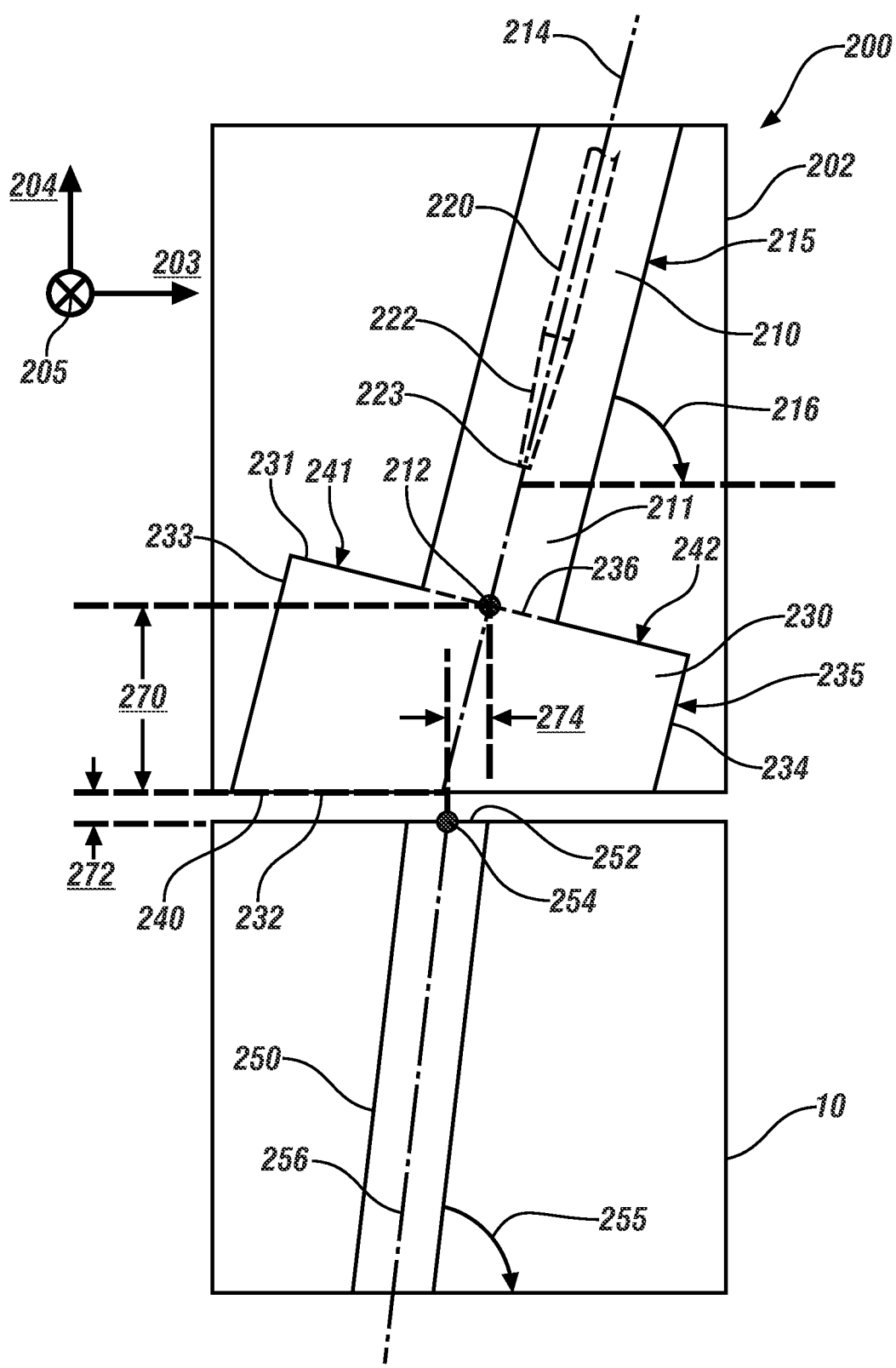
FIG. 2 schematically illustrates a top view perspective of an embodiment of a photonic edge coupler that is arranged to receive light from an embodiment of the laser that is described with reference to FIG. 1, in accordance with the disclosure.
Figures 1, 3:
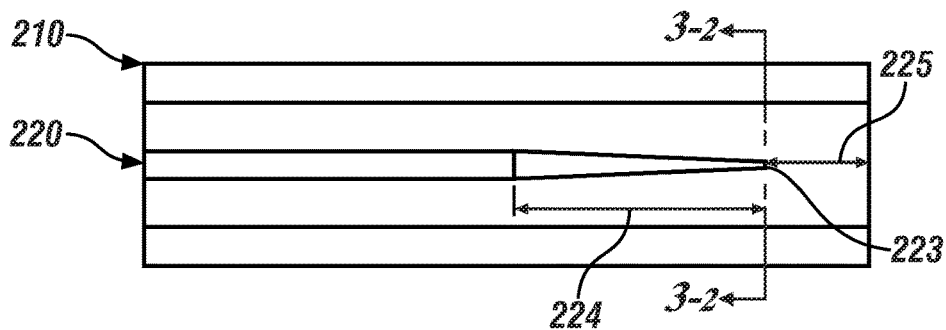
Figures 2, 3:
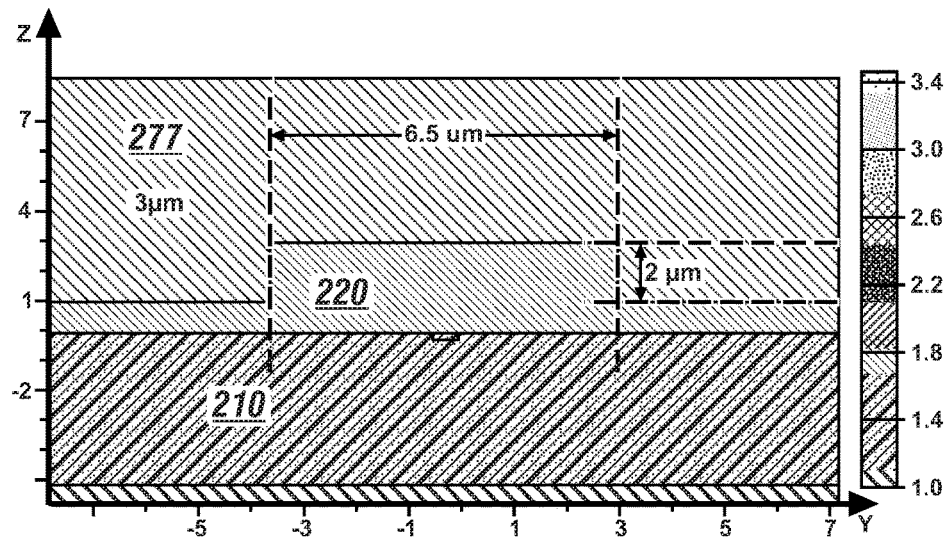

FIGS. 2, 3-1 and 3-2 schematically illustrate details related to the photonic edge coupler 200, which is arranged as an edge coupler or spot size converter (SSC) to facilitate hybrid integration of a high power, low linewidth, semiconductor laser that may be fabricated hybridly, heterogeneously, or monolithically with silicon and/or group III-V semiconductor material, and is designed to be immune to back reflections into a laser cavity, such as laser 10 that is described with reference to FIG. 1. This is done by bending the optical waveguides of the laser 10 in such manner that they meet front and back facets at an angle, usually between 6 and 7 degrees. In order to couple the light signal from the front or back facet of the laser into a silicon photonic integrated chip a special type of edge coupler is needed. For this edge coupler to be able to couple the light signal into the silicon photonic chip in an efficient manner, it is critical to consider a near-field profile of the laser and the high degree of vertical divergence that these lasers usually possess.

The photonic edge coupler 200 is designed to accommodate a high divergence angle in the vertical direction and a highly distorted near-field mode profile. The basic principle behind the operation of the photonic edge coupler 200 is as follows. To accommodate a distorted mode profile of the light signal that may occur at a proximal laser facet, the light signal exiting the laser 10 is allowed to freely propagate in a lateral direction after meeting the photonic edge coupler 200, while in the vertical direction it is guided by total internal reflection, thus accommodating high divergence angles that may occur in the vertical direction. The optical waveguide section of the edge coupler that matches the mode of incoming laser beam is formed downstream. Once the light signal is captured in this optical waveguide that is formed away from the facet, it can be coupled into the silicon wire optical waveguide using a taper design. This is now described in detail.

Referring again to FIG. 2, a top-view of an embodiment of a photonic edge coupler 200 that is disposed on a silicon photonic substrate 202 and arranged to receive light from an embodiment of the laser 10 that is described with reference to FIG. 1. The photonic edge coupler 200 includes a slab waveguide 230, a ridge waveguide 210, and a silicon wire waveguide 220. A three-dimensional coordinate system is indicated, including an x-axis 203, a y-axis 204, and a z-axis 205.

The slab waveguide 230, the ridge waveguide 210, and the silicon wire waveguide 220 are arranged in a guided propagation region 215 and a lateral-free propagation region 235. The lateral-free propagation region 235 includes the slab waveguide 230 including a first facet 240 and defines a region that permits free propagation of light in a lateral direction that is parallel to the silicon photonic substrate 202. The guided propagation region 215 includes the ridge waveguide 210 and the silicon wire waveguide 220.

The slab waveguide 230 is a planar element that is fabricated from silicon oxynitride (SiON) in one embodiment and defines the lateral-free propagation region 235. The slab waveguide 230 includes a first end 231, a second end 232, and first and second sides 233, 234, respectively. The first end 231 of the slab waveguide 230 is joined to an end portion 211 of the ridge waveguide 210 at a junction 236. The first end 231 of the slab waveguide 230 is wider than the end portion 211 of the ridge waveguide 210, and includes wing portions 241, 242 that extend laterally. The wing portions 241, 242 may have widths in the order of magnitude of 10 um in one embodiment. The widths of the wing portions 241, 242 of the slab waveguide 230 may be another dimension, so long as free propagation of light in the lateral direction is not disturbed.

The second end 232 of the slab waveguide 230 forms the first facet 240. The first facet 240 is disposed opposite to a laser facet 252, and separated by a gap 272, which is 1 um in one embodiment. The first facet 240 is disposed at an angle relative to the longitudinal axis 214 that is defined by the ridge waveguide 210, with an angle 216 of the longitudinal axis 214 being less than 90 degrees relative to the y-axis 204. In one embodiment, the angle 216 is 76.5 degrees. As such, a light interface surface of the first facet 240 is angled relative to the longitudinal axis 214 and relative to the laser facet 252.

The slab waveguide 230 is configured to facilitate free propagation of light in the lateral direction, i.e., no waveguiding. However, light is totally internally confined in the vertical direction.

The ridge waveguide 210 is fabricated from silicon oxynitride (SiON) in one embodiment, and defines, with the silicon wire waveguide 220, the guided propagation region 215 and the longitudinal axis associated with a direction of a light signal therein. In one embodiment, the ridge waveguide 210 includes an upper cladding fabricated from SiON and a bottom cladding fabricated from SiO2. This is illustrated with reference to FIG. 3-2. The ridge waveguide 210 is formed in an angle but away from the first facet 240 to allow proper capture of free diverging laser light that has been captured in the slab waveguide 230.

The longitudinal axis 214 of the ridge waveguide 210 defines a first center point 212 at the junction 236 between the first end 231 of the slab waveguide 230 and the ridge waveguide 210. The junction 236 between the first end 231 of the slab waveguide 230 and the ridge waveguide 210 includes a recess 270, wherein the ridge waveguide 210 is recessed from the first facet 240 at the first center point 212. In one embodiment, the recess 270 measures at least 9 micrometers. The distance between the edge coupler facet and the center of the ridge waveguide 210 is governed by the laser mode shape and dimensions before it meets the ridge waveguide 210.

The silicon wire waveguide 220 is fabricated from silicon and is disposed in and under the ridge waveguide 210, and under the silicon photonic substrate 202, i.e., a SiON blanket layer shown in seen in FIG. 3-2. As shown with reference to FIG. 3-1, the silicon wire waveguide 220 includes a longitudinally tapered portion 222 that includes a tip end 223. The tip end 223 is recessed from the first center point 212 formed at the junction 236 between the first end 231 of the slab waveguide 230 and the ridge waveguide 210. The recess 225 of the tip end 223 from the first center point 212 is indicated on FIG. 3-1.

Referring again to FIG. 2, the laser facet 252 is disposed at an end of a laser waveguide 250 that is in optical communication with the laser 10. The laser waveguide 250 defines a laser longitudinal axis 256, which passes through a second, laser center point 254 of the laser facet 252. The laser facet 252 is positioned at an angle 255 relative to the laser longitudinal axis 256.

The second, laser center point 254 associated with the laser waveguide 250 is laterally offset from the first center point 212 of the ridge waveguide 210. The lateral offset 274, defined relative to the x-axis 203, may be 700 nm in one embodiment. The magnitude of the lateral offset 274 is determined based upon the material properties that make up the edge coupler 200.

Furthermore, the orientation of the Si-wire waveguide 220 and the ridge waveguide 210 depend on the angle at which the light leaves the laser facet 252 for a given set of material properties that make up the edge coupler 200.

The output waveguide for high power semiconductor lasers often meets the end facet at an angle, commonly 6-8 degrees.

FIGS. 3-1 and 3-2 schematically illustrate a top-view and a cutaway end-view, respectively, of a portion of the ridge waveguide 210 including the Si-wire waveguide 220, including taper length 224 and the recess 225 of the tip end 223 of the Si-wire waveguide 220 from the first center point 212, which may be covered by upper cladding 277 in one embodiment. Details related to selection of a desired length for the taper length 224 and configuration of the tapered portion 222 are described with reference to FIG. 4.

Alternatively, the upper and lower claddings may be fabricated from other materials, including, e.g., SiN, BCB, and others, including having the upper cladding always having a higher refractive index than the bottom cladding.

The Si-wire waveguide 220 may be fabricated from another material, including, e.g., InP, GaAs, and others, including having a refractive index that is greater than materials selected for both upper and lower claddings. Cladding in an integrated optical waveguide includes one or more layers of materials of lower refractive index, in intimate contact with a core material of higher refractive index. The cladding causes light to be confined to the core of the fiber by total internal reflection at the boundary between the two.

The concepts described herein accommodate semiconductor lasers wherein an output waveguide interfaces with output facet of the laser die in an angle. This serves to overcome any distortion of the laser mode, for the type of lasers mentioned above, by allowing the light to propagate freely in the laterally-free propagation region.

Figure 4:
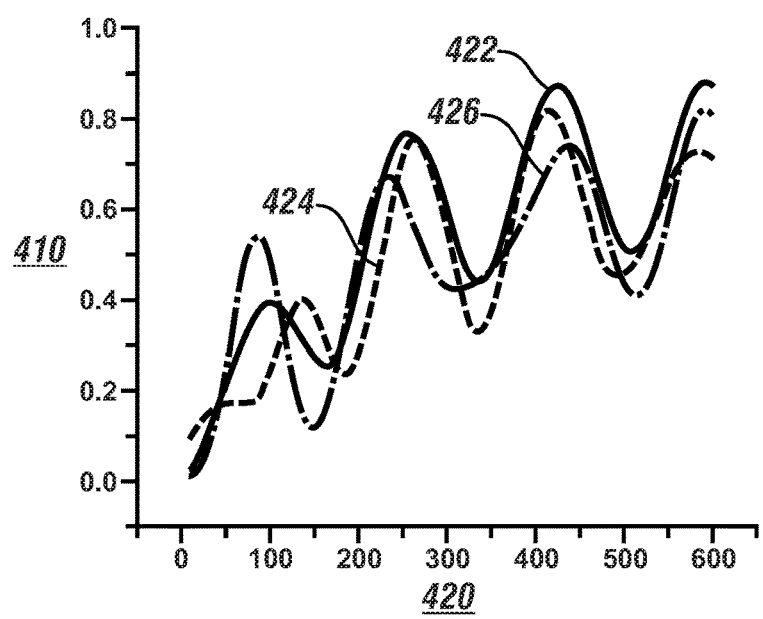
FIG. 4 graphically illustrates light efficiencies in relation to taper length situations where the laser mode may be positioned in a slightly different height in the vertical direction, in accordance with the disclosure.

FIG. 4 graphically shows light efficiencies 410 (shown in the vertical axis) in relation to taper length 420 (shown in the horizontal axis) for three different situations where the laser mode may be positioned in a slightly different height in the vertical direction 205 than a reference position marked by dz=0. For example, dz=250 nm (422) means displacing the laser mode from the reference position by +250 nm in vertical direction 205. The term dz=0 nm (424) means no displacement of the laser mode from the reference position in vertical direction 205. The term dz=−250 nm (426) means displacing the laser mode from the reference position by −250 nm in vertical direction 205. The results may be used to select and optimize the taper length of the Si-wire waveguide to achieve maximum efficiency related to light pickup.

Figure 5:
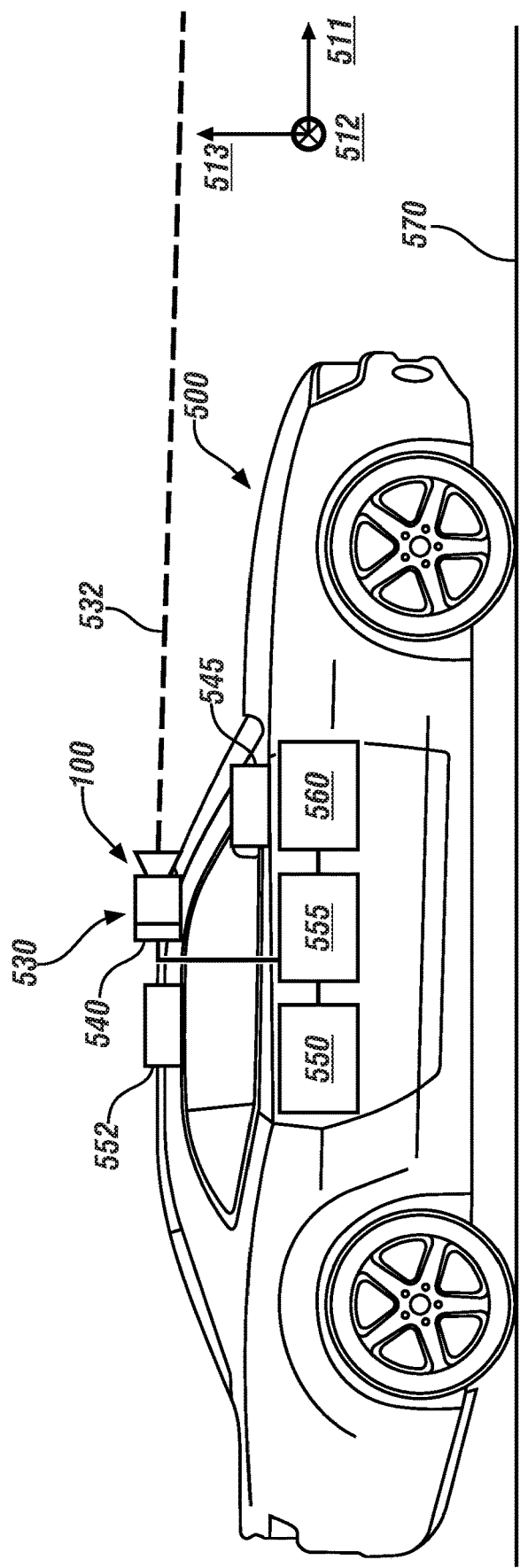
FIG. 5 schematically illustrates an embodiment of a LiDAR device, wherein the LiDAR sensor is an element of a spatial monitoring system that is disposed on a vehicle to monitor a field of view, in accordance with the disclosure.

FIG. 5 schematically illustrates a vehicle 500 that employs a LiDAR system 530 that includes an embodiment of the LiDAR device 100 that is described with reference to FIG. 1. In one embodiment, and as described herein, the LiDAR system 530 is an element of a spatial monitoring system 540 including a spatial monitoring controller 555 that is disposed on the vehicle 500. The concepts described herein may be employed on various systems that may benefit from information determined from an embodiment of the LiDAR system 530.

A side-view of the vehicle 500 is shown, which is disposed on and able to traverse a travel surface 570 such as a paved road surface. The vehicle 500 and the travel surface 570 define a three-dimensional coordinate system including a longitudinal axis 511, a lateral axis 512 and an attitudinal axis 513. The longitudinal axis 511 is defined as being equivalent to a direction of travel of the vehicle 500 on the travel surface 570. The lateral axis 12 is defined as being equivalent to orthogonal to the direction of travel of the vehicle 500 on the travel surface 570. The attitudinal axis 513 is defined as being orthogonal to a plane defined by the longitudinal axis 511 and the lateral axis 512, i.e., as projecting perpendicular to the travel surface 70.

The LiDAR system 530 is disposed on the vehicle 500 to monitor a viewable region 532 that is proximal to the vehicle 500. In one embodiment, the viewable region 532 is forward of the vehicle 500. The vehicle 500 may also include a vehicle controller 550, a global navigation satellite system (GNSS) sensor 552, a human/machine interface (HMI) device 545. The LiDAR system 530 employs a pulsed and reflected laser beam to measure range or distance to an object. When employed in combination with information from the GNSS sensor 552, the spatial monitoring controller 555 is able to determine geospatial locations of objects that are in the viewable region 532 of the vehicle 500.

Other on-vehicle systems may include, by way of non-limiting examples, an on-board navigation system, a computer-readable storage device or media (memory) that includes a digitized roadway map, an autonomous control system, an advanced driver assistance system, a telematics controller, etc., all of which are indicated by element 560. The vehicle 500 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure.

The spatial monitoring system 540 may include other spatial sensors and systems that are arranged to monitor the viewable region 532 forward of the vehicle 500 include, e.g., a surround-view camera, a forward-view camera, and a radar sensor, which may be employed to supplement or complement spatial information that is generated by the LiDAR system 530. Each of the spatial sensors is disposed on-vehicle to monitor all or a portion of the viewable region 532 to detect proximate remote objects such as road features, lane markers, buildings, pedestrians, road signs, traffic control lights and signs, other vehicles, and geographic features that are proximal to the vehicle 500. The spatial monitoring controller 555 generates digital representations of the viewable region 532 based upon data inputs from the spatial sensors. The spatial monitoring controller 555 can evaluate inputs from the spatial sensors to determine a linear range, relative speed, and trajectory of the vehicle 500 in view of each proximate remote object. The spatial sensors can be located at various locations on the vehicle 500, including the front corners, rear corners, rear sides and mid-sides. The spatial sensors can include a front radar sensor and a camera in one embodiment, although the disclosure is not so limited. Placement of the spatial sensors permits the spatial monitoring controller 555 to monitor traffic flow including proximate vehicles, intersections, lane markers, and other objects around the vehicle 500. Data generated by the spatial monitoring controller 555 may be employed by a lane marker detection processor (not shown) to estimate the roadway. As employed herein, the terms "proximate", "proximal" and related terms refer to stationary and mobile objects that are in the vicinity of the vehicle 500 such that they are discernible by one or more of the spatial sensors connected to the spatial monitoring controller 555 including the LiDAR system 530.

The term "controller" and related terms such as microcontroller, control unit, processor and similar terms refer to one or various combinations of Application Specific Integrated Circuit(s) (ASIC), Field-Programmable Gate Array (FPGA), electronic circuit(s), central processing unit(s), e.g., microprocessor(s) and associated non-transitory memory component(s) in the form of memory and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning, buffering and other components, which can be accessed and executed by one or more processors to provide a described functionality. Input/output circuit(s) and devices include analog/digital converters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables. Each controller executes control routine(s) to provide desired functions. Routines may be executed at regular intervals, for example each 100 microseconds during ongoing operation. Alternatively, routines may be executed in response to occurrence of a triggering event. Communication between controllers, actuators and/or sensors may be accomplished using a direct wired point-to-point link, a networked communication bus link, a wireless link or another suitable communication link. Communication includes exchanging data signals in suitable form, including, for example, electrical signals via a conductive medium, an electromagnetic signal via air, light signals via optical waveguides, and the like. The data signals may include discrete, analog or digitized analog signals representing inputs from sensors, actuator commands, and communication between controllers. The term "signal" refers to a physically discernible indicator that conveys information, and may be a suitable waveform (e.g., electrical, optical, magnetic, mechanical or electromagnetic), such as DC, AC, sinusoidal-wave, triangular-wave, square-wave, vibration, and the like, that is capable of traveling through a medium. A parameter is defined as a measurable quantity that represents a physical property of a device or other element that is discernible using one or more sensors and/or a physical model. A parameter can have a discrete value, e.g., either "1" or "0", or can be infinitely variable in value.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A photonic edge coupler, comprising:
a slab waveguide and a ridge waveguide disposed on a substrate;
wherein the ridge waveguide includes a silicon wire waveguide;
wherein the silicon wire waveguide includes a tapered portion;
wherein a first end of the slab waveguide is joined to the ridge waveguide at a junction;
wherein a second end of the slab waveguide forms a first facet;
wherein the ridge waveguide defines a longitudinal axis associated with a direction of a light signal therein;
wherein the first facet is angled at less than 90 degrees relative to the longitudinal axis associated with the direction of the light signal therein;
wherein the first facet is disposed opposite to a laser facet associated with a laser waveguide;
wherein the longitudinal axis of the ridge waveguide defines a first center point at the junction between the first end of the slab waveguide and the ridge waveguide;
wherein the laser facet and the associated laser waveguide define a second center point; and
wherein the second center point is laterally offset from the first center point.

2. The photonic edge coupler of claim 1, wherein the tapered portion of the silicon wire waveguide includes a tip end, wherein the tip end is recessed from the first center point formed at the junction between the first end of the slab waveguide and the ridge waveguide.

3. The photonic edge coupler of claim 1, wherein the slab waveguide forms a lateral-free propagation region.

4. The photonic edge coupler of claim 3, wherein the lateral-free propagation region of the slab waveguide comprises a region that permits free propagation of light in a lateral direction that is parallel to the silicon photonic substrate.

5. The photonic edge coupler of claim 1, wherein the ridge waveguide is recessed from the first facet by at least 9 micrometers at the first center point.

6. The photonic edge coupler of claim 1, wherein the ridge waveguide including the silicon wire waveguide forms a guided propagation region.

7. The photonic edge coupler of claim 1, wherein the tapered portion of the silicon wire waveguide is selected to achieve a maximum an optimum efficiency related to light pickup.

8. The photonic edge coupler of claim 1, wherein the first facet comprises an optically smooth coupling facet.

9. The photonic edge coupler of claim 1, wherein the slab waveguide is fabricated from silicon oxynitride (SiON).

10. The photonic edge coupler of claim 1, wherein the ridge waveguide is fabricated from silicon oxynitride (SiON).

11. The photonic edge coupler of claim 10, wherein the ridge waveguide includes an upper cladding fabricated from SiON and a bottom cladding fabricated from silicon oxide (SiO2).

12. The photonic edge coupler of claim 1, wherein the slab waveguide is arranged to effect capture of light from the laser facet that impinges upon the first facet.

13. A photonic edge coupler, wherein the photonic edge coupler is disposed on a silicon photonic substrate and arranged to receive light from a laser, the photonic edge coupler comprising:
a slab waveguide, a ridge waveguide, and a silicon wire waveguide disposed on a substrate;
wherein the silicon wire waveguide is arranged in the ridge waveguide;
wherein the silicon wire waveguide includes a longitudinally tapered portion;
wherein a first end of the slab waveguide is joined to the ridge waveguide at a junction;
wherein a second end of the slab waveguide forms a first facet;
wherein the ridge waveguide defines a longitudinal axis associated with a direction of a light signal therein;
wherein the first facet is angled at less than 90 degrees relative to the longitudinal axis associated with the direction of the light signal therein;
wherein the first facet is opposed to a laser facet associated with a laser waveguide in communication with the laser;
wherein the longitudinal axis of the ridge waveguide defines a first center point at the junction between the first end of the slab waveguide and the ridge waveguide;
wherein the laser facet and the associated laser waveguide define a second center point; and
wherein the second center point is laterally offset from the first center point.

14. The photonic edge coupler of claim 13, wherein the tapered portion of the silicon wire waveguide includes a tip end, wherein the tip end is recessed from the first center point formed at the junction between the first end of the slab waveguide and the ridge waveguide.

15. The photonic edge coupler of claim 13, wherein the slab waveguide comprises a lateral-free propagation region that permits free propagation of light in a lateral direction that is parallel to the silicon photonic substrate.

16. The photonic edge coupler of claim 13, wherein the ridge waveguide is recessed from the first facet by at least 9 micrometers at the first center point.

17. The photonic edge coupler of claim 13, wherein the ridge waveguide including the silicon wire waveguide forms a guided propagation region.

18. The photonic edge coupler of claim 13, wherein the slab waveguide is fabricated from silicon oxynitride (SiON).

19. The photonic edge coupler of claim 13, wherein the ridge waveguide includes an upper cladding fabricated from SiON and a bottom cladding fabricated from silicon oxide (SiO2).

20. A light detection and ranging (LiDAR) device, comprising:
a laser, a photonic edge coupler, a transmit optical splitter, an optical circulator, a photodetector, and an optical phased array;
wherein the laser, the photonic edge coupler, the transmit optical splitter, the optical circulator, the photodetector, and the optical phased array are arranged as a chip-scale package on a single semiconductor device;

wherein the laser generates a first light signal that is transmitted to an aperture of the optical phased array via the photonic edge coupler, transmit optical splitter, the optical circulator, and the optical phased array;

wherein the photonic edge coupler includes:
- a slab waveguide, a ridge waveguide, and a silicon wire waveguide disposed on a substrate,
- wherein the silicon wire waveguide is arranged in the ridge waveguide,
- wherein the silicon wire waveguide includes a longitudinally tapered portion,
- wherein a first end of the slab waveguide is joined to the ridge waveguide at a junction,
- wherein a second end of the slab waveguide forms a first facet,
- wherein the ridge waveguide defines a longitudinal axis associated with a direction of a light signal therein,
- wherein the first facet is angled at less than 90 degrees relative to the longitudinal axis associated with the direction of the light signal therein,
- wherein the first facet is opposed to a laser facet associated with a laser waveguide in communication with the laser,
- wherein the longitudinal axis of the ridge waveguide defines a first center point at the junction between the first end of the slab waveguide and the ridge waveguide,
- wherein the laser facet and the associated laser waveguide define a second center point, and
- wherein the second center point is laterally offset from the first center point.

* * * * *